(12) United States Patent
Chen et al.

(10) Patent No.: US 8,275,060 B2
(45) Date of Patent: Sep. 25, 2012

(54) CODEBOOK SEARCHING APPARATUS AND METHOD THEREOF

(75) Inventors: Cheng-Ming Chen, Hsinchu (TW);
Yen-Liang Chen, Taipei (TW);
Pang-An Ting, Taichung County (TW);
An-Yu Wu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 546 days.

(21) Appl. No.: 12/608,005

(22) Filed: Oct. 29, 2009

(65) Prior Publication Data

US 2011/0038433 A1    Feb. 17, 2011

(30) Foreign Application Priority Data

Aug. 11, 2009  (TW) .............................. 98127024 A

(51) Int. Cl.
 *H04K 1/10*  (2006.01)
(52) U.S. Cl. .......................... 375/260; 370/329; 375/295
(58) Field of Classification Search .................. 375/260, 375/267, 296, 295; 370/329, 328, 252
See application file for complete search history.

(56) References Cited

U.S. PATENT DOCUMENTS

| 8,050,357 B2 * | 11/2011 | Clerckx et al. ................ 375/299 |
| 8,179,775 B2 * | 5/2012 | Chen et al. .................... 370/203 |
| 2007/0165738 A1 * | 7/2007 | Barriac et al. ................ 375/267 |
| 2008/0225962 A1 * | 9/2008 | Zhou et al. .................... 375/260 |
| 2008/0304463 A1 | 12/2008 | Borkar et al. |
| 2008/0304464 A1 | 12/2008 | Borkar et al. |

OTHER PUBLICATIONS

Article titled "Proposal for IEEE 802.16m Differential Encoding/Decoding for CL-MIMO Codebook Feedback" published in May 2008 by Nortel, IEEE C802.16m-08/347.

* cited by examiner

*Primary Examiner* — Kevin Kim
(74) *Attorney, Agent, or Firm* — Jianq Chyun IP Office

(57) ABSTRACT

Exemplary embodiments of the present disclosure propose multiple codebook searching methods for a receiver in a communication system, wherein the communication system uses a codebook having L pre-coding matrices. First, L matrices are calculated according to the L pre-coding matrices, and the L matrices are inversed mean square error matrices of the L pre-encoding matrices. Then, diagonal cofactors or determinants of at least S matrices of the L matrices are calculated, and a pre-coding matrix used by the receiver is found according to the maximum cofactors of the diagonal of the at least S matrices or ratios between the maximum cofactors of the diagonals and the determinants of the at least S matrices.

20 Claims, 8 Drawing Sheets

| Size of the pre-coding matrix | Size of the inversed MSE matrix | HF rank |
| --- | --- | --- |
| 8x4 | 4x4 | 4 |
| 8x3 | 3x3 | 3 |
| 8x2 | 2x2 | 2 |
| 4x3 | 3x3 | 3 |
| 4x2 | 2x2 | 2 |

CODEBOOK SEARCHING APPARATUS AND METHOD THEREOF

CROSS-REFERENCE TO RELATED APPLICATION

This application claims the priority benefit of Taiwan application serial no. 98127024, filed on Aug. 11, 2009. The entirety of the above-mentioned patent application is hereby incorporated by reference herein and made a part of specification.

BACKGROUND

1. Technical Field

The present disclosure relates to a receiver of a multiple input multiple output (MIMO) wireless communication system. More particularly, the present disclosure relates to a codebook searching apparatus of a receiver and a method thereof.

2. Description of Related Art

Present communication standards, such as IEE 802.16m and long term evolution (LTE) all support a closed loop multiple input multiple output (MIMO) wireless communication transmission technique, and an important technique thereof is to implement a pre-coding technique through a codebook. Theoretically, the more the pre-coding members (i.e. pre-coding matrices) are, the more complicated the required operation is. Presently, a plurality of rules can be used to determine whether a pre-coding matrix is suitable.

There are three documents related the codebook searching methods, one is "Proposal for IEEE 802.16m Differential Encoding/Decoding for CL-MIMO Codebook Feedback" published in May 2008 by Nortel, in which a basic concept and idea thereof is concluded according to a document of IEEE C802.16m Contribution with a serial number of IEEE C802.16m-08/347. Moreover, the other two documents are U.S patents disclosed by Texas Instruments on Dec. 11, 2008, which are respectively "Reduced Search Space Technique for Codeword Selection, US 2008/0304463 A1" and "Low Complexity Pre-coding Matrix Selection, US 2008/0304464 A1".

These three documents have a common assumption that a wireless channel is slowly changed. Therefore, within a time period, at a certain time point $t_0$, a full search (or exhaustive search) is performed to all of the codebooks, which is a general operation, and at the next several time points, a small range searching is performed while taking the pre-coding matrix selected at the previous time point as a reference, wherein the small range is a predetermined range. It should be noticed that the whole procedure has to be repeated every a time period T, so as to avoid generating a severe error propagation.

Assuming the codebook has L pre-coding matrices, and each of the pre-coding matrices specifies p−1 closest pre-coding matrices. The method to specify p−1 closest pre-coding matrices is to categorize the matrices according to an inner product of two pre-coding matrices, and the greater the inner product is, the higher the similarity of the two pre-coding matrices is, so that a next search is performed on p pre-coding matrices including the p−1 closet pre-coding matrices and the pre-coding matrix itself. Wherein, the categorization can be performed according to an off-line operation, and after the pre-coding matrices are categorized, a transmitter and a receiver have to store a relation table of the pre-coding matrices, which may occupy extra memories.

Within the time period T, the search can be performed on the categorized pre-coding matrices, and when each integral time T is reached, the conventional full search has to be performed. Therefore, though a required searching range of the aforementioned codebook searching method can be reduced in most of the time, the full search with the highest complexity has to be performed every a time period.

SUMMARY

The present disclosure provides a codebook searching method for a communication system, wherein the communication system uses a codebook having L pre-coding matrices, and L is greater than or equal to 2. First, L matrices are calculated according to the L pre-coding matrices, and the L matrices are inversed mean square error (MSE) matrices of the L pre-coding matrices. Next, when the L pre-coding matrices are square, a first step is executed, and the first step comprises: calculating cofactors of diagonals of the L matrices; finding a maximum cofactor of the diagonal of each of the L matrices; and finding a pre-coding matrix corresponding to a minimum one of the maximum cofactors of the diagonals of the L matrices.

The present disclosure provides a codebook searching method for a communication system, wherein the communication system uses a codebook having L pre-coding matrices, and L is greater than or equal to 2. First, L matrices are calculated according to the L pre-coding matrices, and the L matrices are inversed MSE matrices of the L pre-coding matrices. Next, when the L pre-coding matrices are non-square, one of a first to a fourth steps is selectively executed. Wherein, the first step comprises: calculating determinants of the L matrices; calculating cofactors of diagonals of the L matrices; finding a maximum cofactor of the diagonal of each of the L matrices; and finding a pre-coding matrix corresponding to a minimum one of ratios between the maximum cofactors of the diagonals and the determinants of the L matrices. The second step comprises: calculating the determinants of the L matrices; and obtaining a pre-coding matrix corresponding to the maximum one of the determinants of the L matrices. The third step comprises: calculating diagonal products of the L matrices; eliminating (L−S) matrices with relatively small diagonal products from the L matrices to remain S matrices, wherein S is less than L and is greater than or equal to 1; calculating determinants of the S matrices; calculating cofactors of diagonals of the S matrices; finding a maximum cofactor of the diagonal of each of the S matrices; and finding a pre-coding matrix corresponding to a minimum one of ratios between the maximum cofactors of the diagonals and the determinants of the S matrices. The fourth step comprises: calculating the diagonal products of the L matrices; eliminating (L−S) matrices with relatively small diagonal products from the L matrices to remain S matrices, wherein S is less than L and is greater than or equal to 1; calculating the determinants of the S matrices; and finding a pre-coding matrix corresponding to a maximum one of the determinants of the S matrices.

The present disclosure provides a codebook searching apparatus for a communication system, wherein the communication system uses a codebook having L pre-coding matrices, and L is greater than or equal to 2. The codebook searching apparatus includes a matrix operation unit, a judgment unit, a calculation unit and a decision unit. The matrix operation unit calculates L matrices according to the L pre-coding matrices, wherein the L matrices are inversed MSE matrices of the L pre-coding matrices. The judgment unit judges whether the L pre-coding matrices are square, and is used to control the calculation unit and the decision unit. When the L pre-coding matrices are square, the calculation unit calculates maximum cofactors of diagonals of the L matrices. When the L pre-coding matrices are non-square, the calculation unit calculates the maximum cofactors of the diagonals and determinants of at least S matrices of the L matrices, wherein L is greater than S. When the L pre-coding matrices are square, the decision unit finds a pre-coding matrix corresponding to a minimum one of the maximum cofactors of the diagonals of the L matrices. When the L pre-coding matrices are non-square, the decision unit finds a pre-coding matrix among at least S matrices corresponding to a minimum one of ratios between the maximum cofactors of the diagonals and their corresponding determinants.

The present disclosure provides a codebook searching apparatus for a communication system, wherein the communication system uses a codebook having L pre-coding matrices, and L is greater than or equal to 2. The codebook searching apparatus includes a matrix operation unit, a judgment unit, a calculation unit and a decision unit. The matrix operation unit calculates L matrices according to the L pre-coding matrices, wherein the L matrices are inversed MSE matrices of the L pre-coding matrices. The judgment unit judges whether the L pre-coding matrices are square, and is used to control the calculation unit and the decision unit. When the L pre-coding matrices are square, the calculation unit calculates maximum cofactors of diagonals of the L matrices. When the L pre-coding matrices are non-square, the calculation unit calculates determinants of at least S matrices of the L matrices, wherein L is greater than S. When the L pre-coding matrices are square, the decision unit finds a pre-coding matrix corresponding to a minimum one of the maximum cofactors of the diagonals of the L matrices. When the L pre-coding matrices are non-square, the decision unit finds a pre-coding matrix corresponding to a maximum one of the determinants of the at least S matrices.

In order to make the aforementioned and other features and advantages of the present disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6 is a look-up table of code sizes defined according to most of the present standards.

DESCRIPTION OF THE EXEMPLARY EMBODIMENTS

Figure 1:
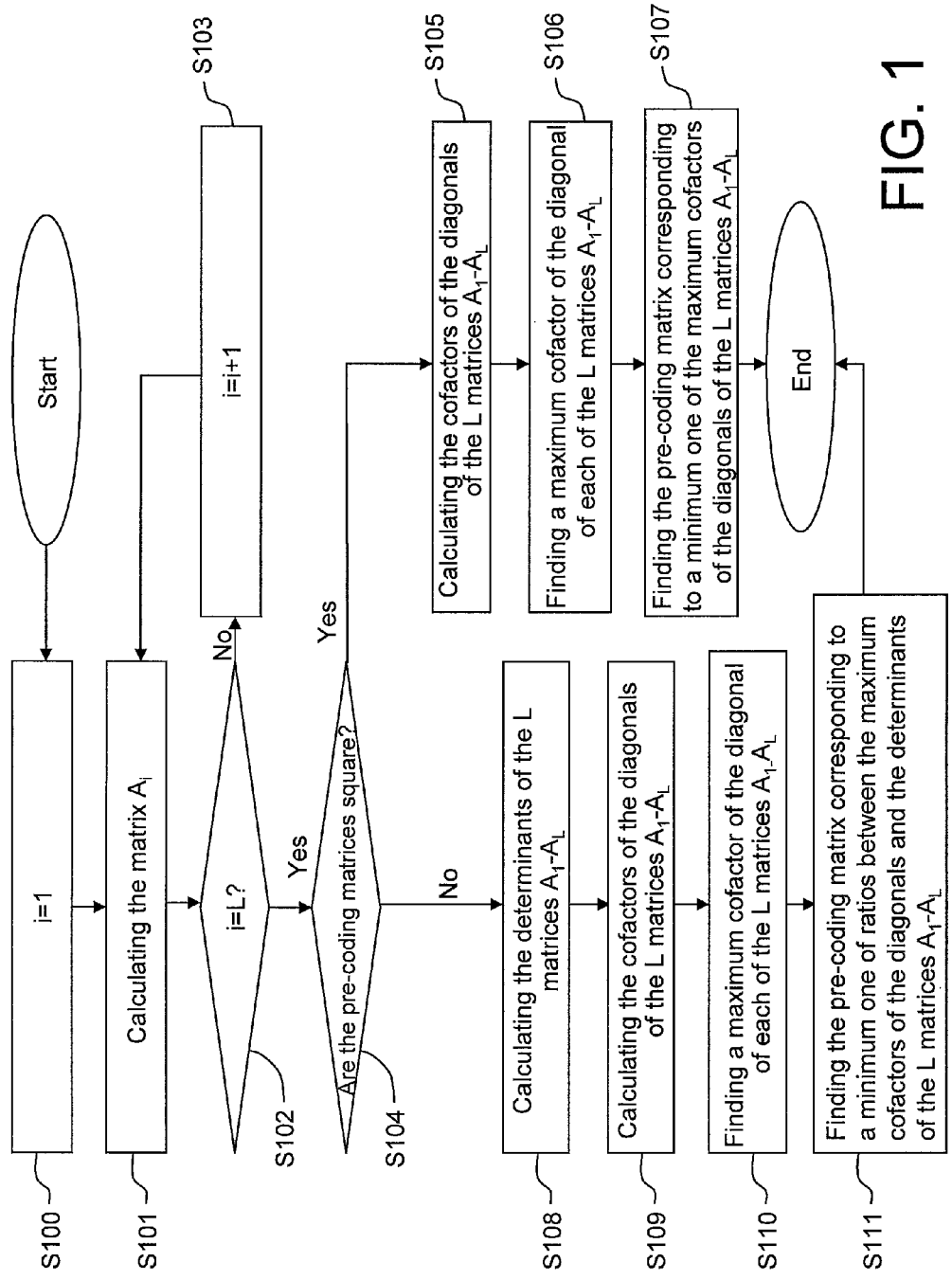
FIG. 1 is a flowchart illustrating a codebook searching method according to an exemplary embodiment of the present disclosure.

An embodiment of the present disclosure provides multiple codebook searching methods and an apparatus using the same, by which a suitable pre-coding matrix used by a receiver can be selected.

Presently, there are multiple rules for determining the suitable pre-coding matrix, and a definition of one of the rules for determining a suitable pre-coding matrix F is as follows:

$$F = \arg\min_{F_i} \max_{i \in 1 \sim L, k \in 1 \sim d} [F_i^H H^H H F_i + (dN_0/\varepsilon_s)I_d]_{k,k}^{-1}$$

Where H is an equivalent flat attenuation channel response matrix, $F_i$ is an $i^{th}$ pre-coding matrix in the codebook, d represents data amount simultaneously transmitted by a multiple input multiple output (MIMO) system, $N_0$ represents a noise power, $\varepsilon_s$ represents transmitted energy, and $I_d$ represents a unit matrix with a size of d. Here, $F_i^H H^H HF_i + (dN_0/\varepsilon_s)I_d$ is equal to a matrix $A_i$, then, $[A_i]_{k,k}$ represents a $k^{th}$ value of a diagonal of the matrix $A_i$, $A_i^{-1}$ represents an inversed matrix of the matrix $A_i$, and $F_i^H$ and $H^H$ respectively represent Hermitian matrices of $F_i$ and H.

Actually, the inversed matrix $A_i^{-1}$ of the matrix $A_i$ is a mean square error (MSE) matrix of a signal, and the aforementioned judgment rule is to select a pre-coding matrix satisfying a condition that a maximum value of the diagonal of the MSE matrix can be the minimum. Therefore, if each of the pre-coding matrices is calculated to obtain the inversed MSE matrix, and the inversed MSE matrix is calculated according to an inversed matrix operation with a high complexity to obtain the MSE matrix, a chip area of the receiver used for calculating the matrices is huge, and an operation time thereof is very long. It should be noticed that the aforementioned rule is adapted to circumstances that the pre-coding matrix is square or non-square. Therefore, the present exemplary embodiment applies such rule for description, through the present disclosure is not limited thereto.

Since according to the aforementioned judgment rule, only the diagonals in the MSE matrices are required to be compared, and other non-diagonal elements in the MSE matrices are totally useless, in the present exemplary embodiment, a cofactor expansion is used to calculate the MSE matrices, so as to save a calculation amount of the non-diagonal elements of the MSE matrices. Here, assuming the inversed MSE matrix $A_i$ is 3×3 square, and is represented by:

$$A_i = \begin{bmatrix} a_{11} & a_{12} & a_{13} \\ a_{21} & a_{22} & a_{23} \\ a_{31} & a_{32} & a_{33} \end{bmatrix},$$

the corresponding inversed matrix $A_1^{-1}$ is represented by:

$$A_i^{-1} = \frac{1}{\det(A_i)} \begin{bmatrix} c_{11} & c_{12} & c_{13} \\ c_{21} & c_{22} & c_{23} \\ c_{31} & c_{32} & c_{33} \end{bmatrix}^T,$$

where the cofactors $c_{11}$, $c_{22}$ and $c_{33}$ of the diagonal of the inversed MSE matrix are calculated as follows, $c_{11}=a_{22}\times a_{33}-a_{23}\times a_{32}$, $c_{22}=a_{11}\times a_{33}-a_{13}\times a_{31}$, and $c_{33}=a_{11}\times a_{22}-a_{12}\times a_{21}$.

The inversed matrix $A_i^{-1}$ is obtained according to a transpose operation that a determinant of the matrix $A_i$ times a pile of cofactors, wherein the transpose operation is not required to be performed since according to the above judgment rule, only the values of the diagonal of the inversed matrix $A_i^{-1}$ are obtained, and positions of the values of the diagonal are not changed due to the transpose operation. Moreover, calculation of the above 3×3 inversed matrix originally requires to calculate 9 cofactors, but now it is simplified to only calculate 3 cofactors of the diagonal and the determinant of the whole matrix. Therefore, regarding the number of the cofactors, 66% calculation amount is saved. Since in the codebook used according to a present standard (for example, 802.16e or 802.16m), the pre-coding matrices are all unitary matrices, when the pre-coding matrices of the codebook are square, the determinants of the inversed MSE matrices calculated according to the pre-coding matrices are the same. Therefore, when the pre-coding matrices of the codebook are square, according to the above judgment rule, only the cofactors of the diagonal of the inversed MSE matrix are calculated.

Figure 2:
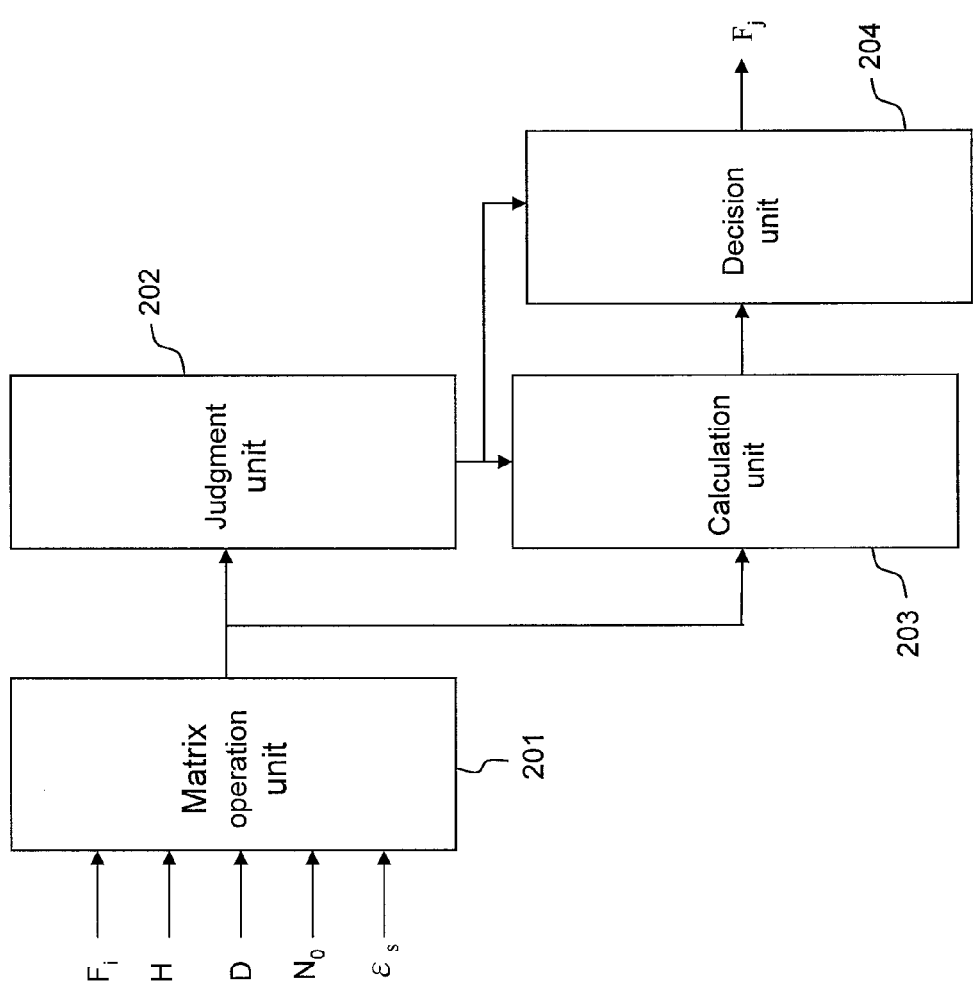
FIG. 2 is a system block diagram illustrating a codebook searching apparatus 200 according to an exemplary embodiment of the present disclosure.

Next, referring to FIG. 1 and FIG. 2, FIG. 1 is a flowchart illustrating a codebook searching method according to an exemplary embodiment of the present disclosure. FIG. 2 is a system block diagram illustrating a codebook searching apparatus 200 according to an exemplary embodiment of the present disclosure. The codebook searching apparatus 200 is used to execute the codebook searching method of FIG. 1, and is applied to a receiver of a MIMO wireless communication system. Assuming the codebook of the receiver has L pre-coding matrices, and the L pre-coding matrices are unitary matrices, and the judgment rule of the pre-coding matrices used by the receiver can be as that described above.

The codebook searching apparatus 200 includes a matrix operation unit 201, a judgment unit 202, a calculation unit 203 and a decision unit 204. The matrix operation unit 201 is coupled to the judgment unit 202 and the calculation unit 203, the judgment unit 202 is coupled to the calculation unit 203 and the decision unit 204, and the calculation unit 203 is coupled to the decision unit 204.

The matrix operation unit 201 is used to receive $F_i$, H, $dN_0$ and $\epsilon_s$, and calculates the inversed MSE matrix corresponding to the pre-coding matrix $F_i$ according to $F_i$, H, $dN_0$ and $\epsilon_s$, i.e. calculates the matrix $A_i$. The judgment unit 202 judges whether the pre-coding matrices of the codebook are square, and controls the calculation unit 203 according to a judgment result to calculate required data of the judgment rule according to L matrices $A_1$–$A_L$, and controls the decision unit 204 according to the judgment result to decide the required pre-coding matrices according to the data calculated by the calculation unit 203. The decision unit 204 decides the pre-coding matrix in the codebook that is used by the receiver according to the data calculated by the calculation unit 203.

It should be noticed that the matrix operation unit 201 can first perform a matrix multiplication between the pre-coding matrix $F_i$ and the equivalent flat fading channel response matrix H to generate a matrix B (B=H$F_i$). Next, the matrix operation unit 201 calculates a Hermitian matrix $B^H$ of the matrix B. Next, the matrix operation unit 201 calculates the matrix $A_i$ ($A_i = B^H B + (dN_0/\epsilon_s)$) according to the matrix B, the Hermitian matrix $B^H$ of the matrix B, d, $N_0$ and $\epsilon_s$. Though, the method that the matrix operation unit 201 calculates the matrix $A_i$ is not used for limiting the present disclosure.

Referring to FIG. 1 and FIG. 2 again, in step S100, the receiver initializes an index value i to 1. Next, in step S101, the matrix operation unit 201 of the codebook searching apparatus 200 calculates the matrix $A_i$, wherein the matrix $A_i$ is equal to $F^*_i H^* HF_i + (dN_0/\epsilon_s I_d)$. Next, in step S102, the matrix operation unit 201 of the codebook searching apparatus 200 checks whether i is equal to L, and if i is not equal to L, a step S103 is executed, otherwise, a step S104 is executed. In the step S103, the matrix operation unit 201 of the codebook searching apparatus 200 adds i by 1, i.e. i=i+1. In brief, according to a loop formed by the steps S100-S103, the matrices $A_1$–$A_L$ are calculated.

Next, in the step S104, the judgment unit 202 of the codebook searching apparatus 200 judges whether the pre-coding matrices of the codebook are square, and if yes, the judgment unit 202 of the codebook searching apparatus 200 controls the calculation unit 203 and the decision unit 204 to execute steps S105-S107, and if not, the judgment unit 202 of the codebook searching apparatus 200 controls the calculation unit 203 and the decision unit 204 to execute steps S108-S111.

As described above, when the pre-coding matrices of the codebook are square, the determinants of the matrices $A_1$–$A_L$ calculated according to the pre-coding matrices $F_1$–$F_L$ are the same. Therefore, in the step S105, the calculation unit 203 of the codebook searching apparatus 200 only calculates the cofactors of the diagonals of the L matrices $A_1$–$A_L$. Next, in step S106, the calculation unit 203 of the codebook searching apparatus 200 finds a maximum cofactor of the diagonal of each of the L matrices $A_1$–$A_L$. Namely, started from i=1, the maximum cofactor of the diagonal of the matrix $A_i$ is found until i=L.

Next, in the step S107, the decision unit 204 of the codebook searching apparatus 200 finds a pre-coding matrix corresponding to a minimum one of the maximum cofactors of the diagonals of the L matrices $A_1$–$A_L$, and provides it to the receiver. For example, the maximum cofactor of the diagonal of the matrix $A_j$ is the minimum one of the maximum cofactors of the diagonals of the matrices $A_1$–$A_L$, and the decision unit 204 of the codebook searching apparatus 200 notifies the receiver to use the pre-coding matrix $F_j$.

When the pre-coding matrices of the codebook are non-square, in the step S108, the calculation unit 203 of the codebook searching apparatus 200 calculates the determinants of the L matrices $A_1$–$A_L$, i.e. calculates det($A_1$)–det($A_L$). Next, in the step S109, the calculation unit 203 of the codebook searching apparatus 200 calculates the cofactors of the diagonals of the L matrices $A_1$–$A_L$. Next, in step S110, the calculation unit 203 of the codebook searching apparatus 200 finds a maximum cofactor of the diagonal of each of the L matrices $A_1$–$A_L$. Namely, started from i=1, the maximum cofactor of the diagonal of the matrix $A_i$ is found until i=L.

Next, in the step S111, the decision unit 204 of the codebook searching apparatus 200 finds the pre-coding matrix corresponding to a minimum one of ratios between the maximum cofactors of the diagonals and the determinants of the L matrices $A_1$–$A_L$, and provides it to the receiver. For example, a ratio between the maximum cofactor of the diagonal and the determinant of the matrix $A_j$ is the minimum one of the ratios among the maximum cofactors of the diagonals and the determinants of the L matrices $A_1$–$A_L$, and therefore the decision unit 204 of the codebook searching apparatus 200 notifies the receiver to use the pre-coding matrix $F_j$.

Figure 3:
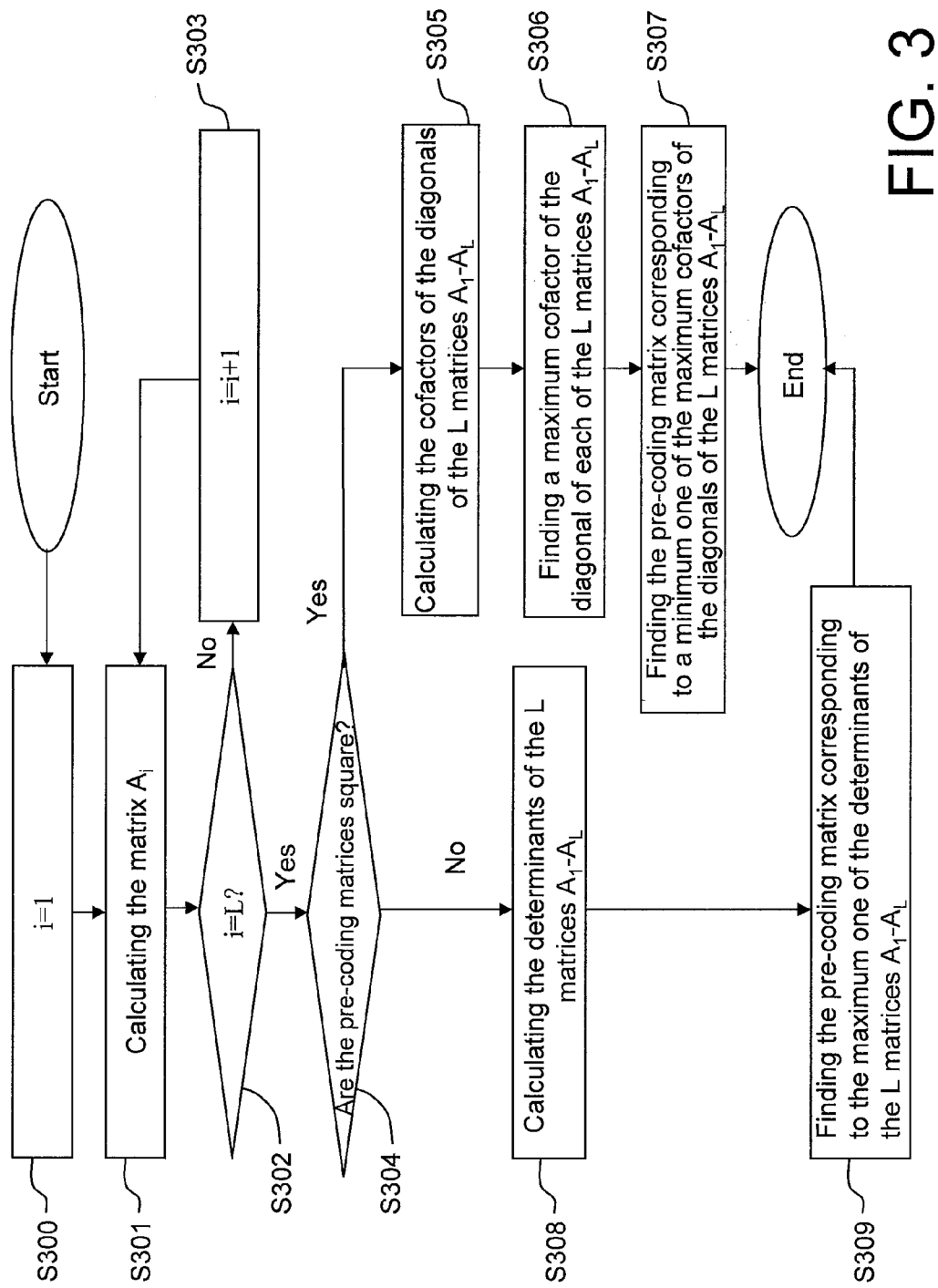
FIG. 3 is a flowchart illustrating another codebook searching method according to an exemplary embodiment of the present disclosure.

When the pre-coding matrices are non-square, if the determinants of the L matrices $A_1$–$A_L$ are far greater than the maximum cofactors of the diagonals thereof, calculations of the maximum cofactors of the diagonals of the matrices $A_1$–$A_L$ are unnecessary, and only the determinants of the matrices $A_1$–$A_L$ are compared, so as to reduce a calculation amount. In this case, the flowchart of the codebook searching method of FIG. 1 can be modified to form a flowchart of FIG. 3. Referring to FIG. 2 and FIG. 3, FIG. 3 is a flowchart illustrating another codebook searching method according to an exemplary embodiment of the present disclosure. Wherein, steps S300-S308 are the same as the steps S100-S108 of FIG. 1, and therefore detailed descriptions thereof are not repeated.

In step S309, the decision unit 204 of the codebook searching apparatus 200 finds a pre-coding matrix corresponding to the maximum one of the determinants of the L matrices $A_1$–$A_L$, and provides it to the receiver. For example, the determinant $\det(A_j)$ of the matrix $A_j$ is the maximum one of the determinants of the matrices $A_1$–$A_L$, the decision unit 204 of the codebook searching apparatus 200 then notifies the receiver to use the pre-coding matrix $F_j$.

When the pre-coding matrices are non-square, time required for calculating the determinants of the matrices is relatively long, and presently most of the pre-coding matrices apply a form of non-square to focus energy on relatively less transmitted signals. According to the codebook searching method of the present exemplary embodiment, the L matrices $A_1$–$A_L$ are eliminated to remain S matrices $A_1'$–$A_S'$ (S is less than L). Wherein, the above eliminating method may use a Hadamard inequality to obtain the S matrices $A_1'$–$A_S'$, and the Hadamard inequality is as follows:

$$\det(A_i) \le \prod_{x=1}^{d} a_{xx}$$

Where $a_{xx}$ represents elements of the diagonal of the matrix $A_i$.

When the pre-coding matrices of the codebook are non-square, the concept of the above Hadamard inequality can be used to eliminate some matrices from the L matrices. First, a diagonal product of each of the L matrices $A_1$–$A_L$ is calculated. Next, (L–S) matrices with relatively small diagonal products in the L matrices $A_1$–$A_L$ are eliminated to remain S matrices $A_1'$–$A_S'$ for follow-up calculation. Therefore, calculations of the determinants and cofactors of the diagonals of the (L–S) matrices can be reduced.

Figure 4:
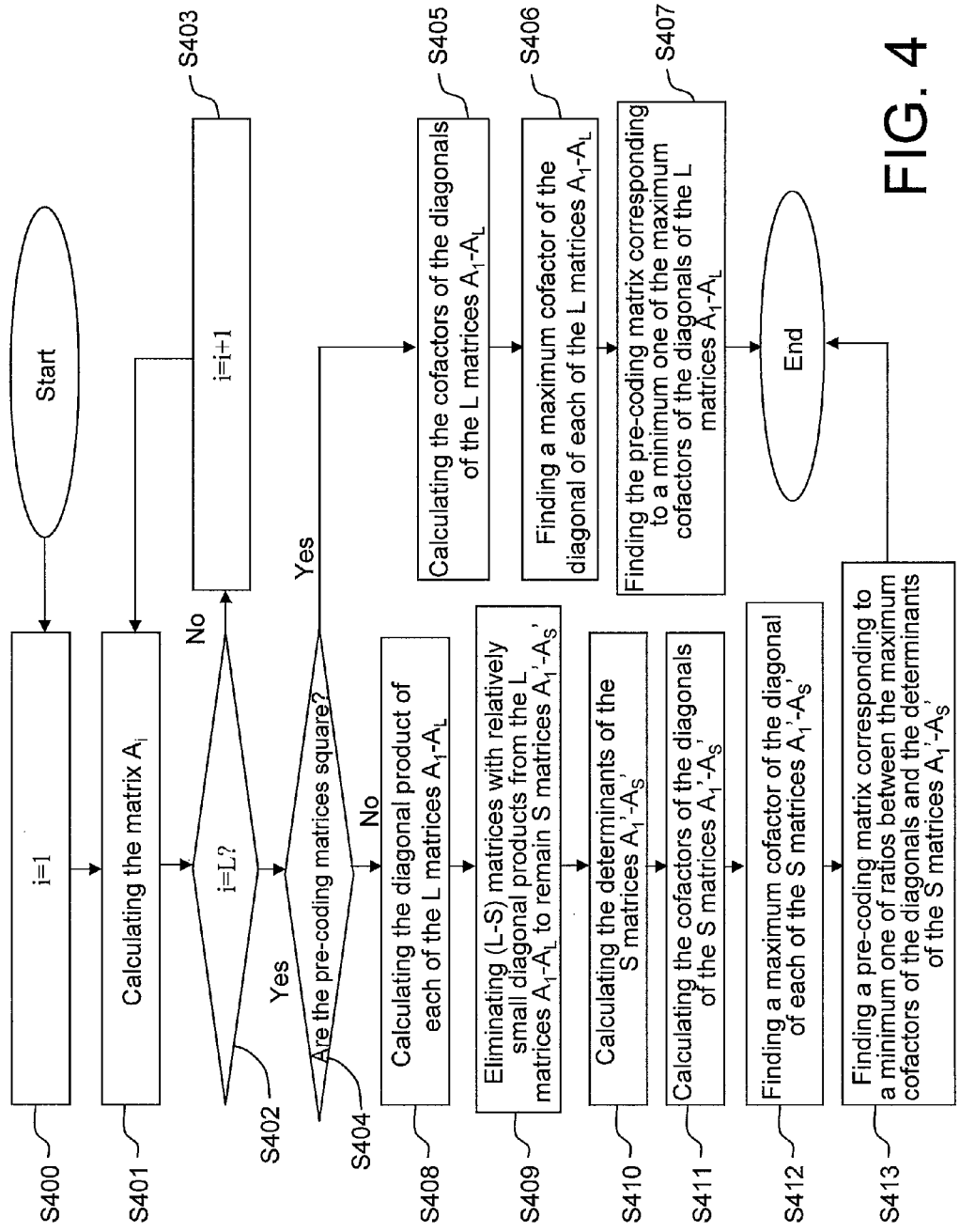
FIG. 4 is a flowchart illustrating another codebook searching method according to an exemplary embodiment of the present disclosure.

Referring to FIG. 2 and FIG. 4, FIG. 4 is a flowchart illustrating another codebook searching method according to an exemplary embodiment of the present disclosure. Wherein, steps S400-S407 are the same to the steps S100-S107 of FIG. 1, and therefore detailed descriptions thereof are not repeated. If the pre-coding matrices of the codebook are non-square, in step S408, the calculation unit 203 of the codebook searching apparatus 200 calculates the diagonal product of each of the L matrices $A_1$–$A_L$, in other words, calculates L diagonal products. Next, in step S409, the calculation unit 203 of the codebook searching apparatus 200 eliminates (L–S) matrices with relatively small diagonal products from the L matrices $A_1$–$A_L$ to remain S matrices $A_1'$–$A_S'$ for follow-up calculation.

The steps S408 and S409 are mainly used for eliminating the pre-coding matrices with lower possibilities, so as to reduce a calculation amount of calculating the determinants of the L matrices $A_1$–$A_L$ that has to be performed in the codebook searching method of FIG. 1. Though, compared to the codebook searching method of FIG. 1, the steps S408 and S409 have to be additionally executed in the codebook searching method of FIG. 4, the calculation results for calculating the diagonal products of the matrices $A_1$–$A_L$ can be used for calculating the determinants of the S matrices $A_1'$–$A_S'$, so that additional calculation is not performed.

In step S410, the calculation unit 203 of the codebook searching apparatus 200 calculates the determinants of the S matrices $A_1'$–$A_S'$. Next, in step S411, the calculation unit 203 of the codebook searching apparatus 200 calculates the cofactors of the diagonals of the S matrices $A_1'$–$A_S'$. Next, in step S412, the calculation unit 203 of the codebook searching apparatus 200 finds a maximum cofactor of the diagonal of each of the S matrices $A_1'$–$A_S'$. Next, in step S413, the decision unit 204 of the codebook searching apparatus 200 finds a pre-coding matrix corresponding to a minimum one of ratios among the maximum cofactors of the diagonals and the determinants of the S matrices $A_1'$–$A_S'$, and provides it to the receiver for utilization.

Figure 5:
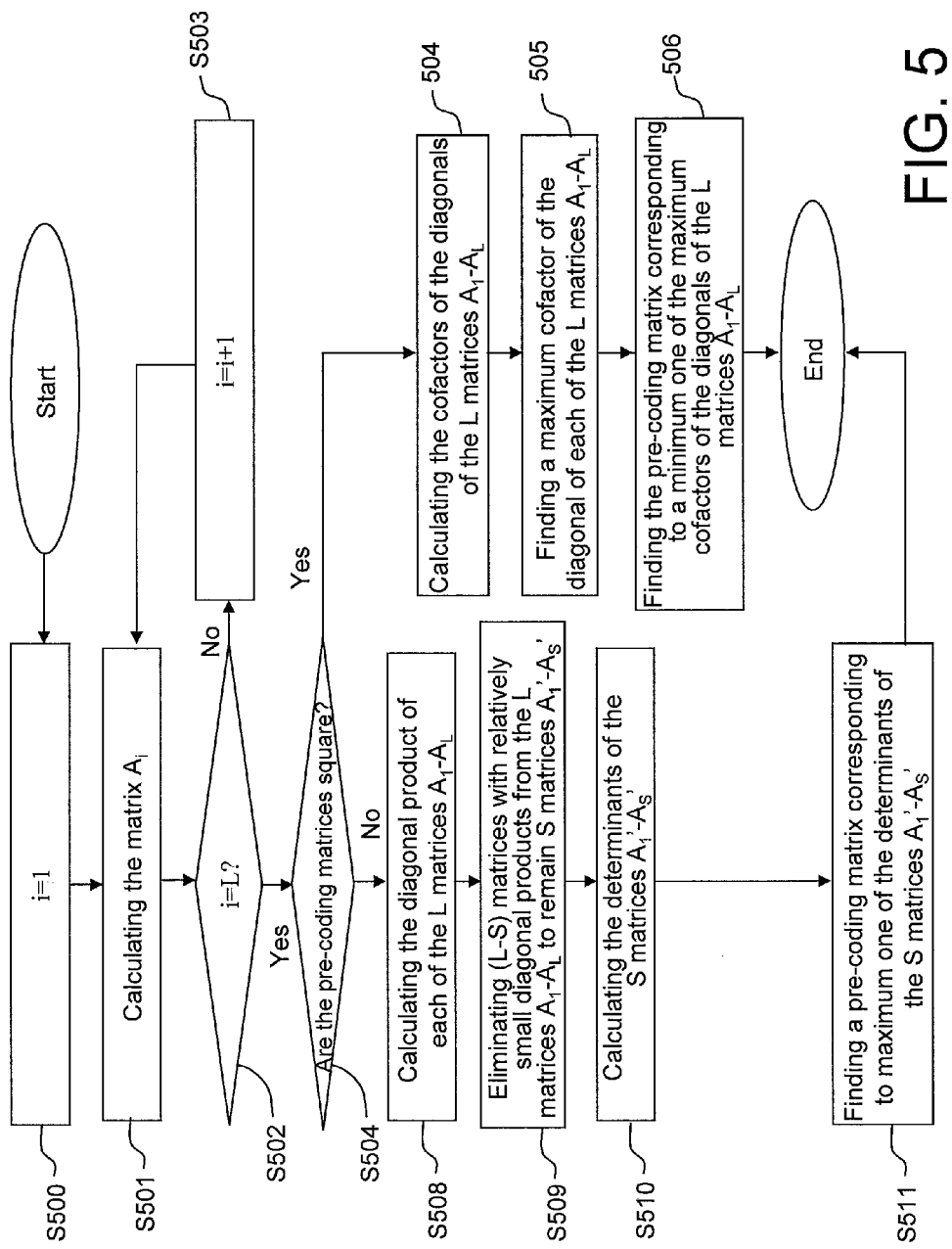
FIG. 5 is a flowchart illustrating another codebook searching method according to an exemplary embodiment of the present disclosure.

Similarly, the method of eliminating the L matrices $A_1$–$A_L$ by using the Hadamard inequality can also be applied to the codebook searching method of FIG. 3. Referring to FIG. 5, FIG. 5 is a flowchart illustrating another codebook searching method according to an exemplary embodiment of the present disclosure. In the present exemplary embodiment, steps S500-S510 are the same to the steps S400-S410 of FIG. 4, and therefore detailed descriptions thereof are not repeated. In step S511, the decision unit 204 of the codebook searching apparatus 200 finds a pre-coding matrix corresponding to a maximum one of the determinants of the S matrices $A_1'$–$A_S'$, and provides it to the receiver for utilization.

Next, simplification is continually performed in allusion to the non-square circumstance. Referring to FIG. 6, FIG. 6 is a look-up table of code sizes defined according to most of the present standards. Codes of a 8×4 pre-coding matrix shown in FIG. 6 are non-symmetric, so that a determinant of a 4×4 inversed MSE matrix is probably calculated. Therefore, each of the matrices with a rank greater than 3 is decomposed to reduce the calculation amount for calculating the determinants of the matrices. Although a size of the inversed MSE matrix is probably 4×4 or greater, after the decomposition, when the cofactor of the inversed MSE matrix is calculated, only a 3×3 determinant is calculated.

Therefore, a QR decomposition calculation unit already existed in the receiver of the MIMO wireless communication system can be used to perform a QR decomposition to the inversed MSE matrix with a size of 4×4 or greater, so that when the cofactor of the matrix is calculated, only a 3×3 determinant is calculated. Next, a 4×4 matrix $A_i$ is used to describe how to simplify calculation of the determinant by using the QR decomposition, though the size of the matrix $A_i$ is not limited to be 4×4, which can be greater than 4×4.

Assuming the matrix $A_i$ is represented by:

$$A_i = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix},$$

after the QR decomposition is performed to the matrix $A_i$, $Q^T A = R$ is obtained, wherein R is represented by:

$$R = Q^T A_i = \begin{bmatrix} r_{11} & r_{12} & r_{13} & r_{14} \\ 0 & r_{23} & r_{23} & r_{24} \\ 0 & r_{32} & r_{33} & r_{34} \\ 0 & r_{42} & r_{43} & r_{44} \end{bmatrix}$$

Since $det(Q^T)=1$, $det(M)=det(Q^T A_i)=det(R)$, namely, $det(R)$ can be represented by:

$$det(R) = r_{11} det \begin{bmatrix} r_{22} & r_{23} & r_{24} \\ r_{32} & r_{33} & r_{34} \\ r_{42} & r_{43} & r_{44} \end{bmatrix}$$

Therefore, by using the QR decomposition to simplify a calculation of the determinant of the matrix $A_i$ with a size greater than 3×3, the time and calculation amount required for searching the pre-coding matrix can be reduced.

Figure 7:
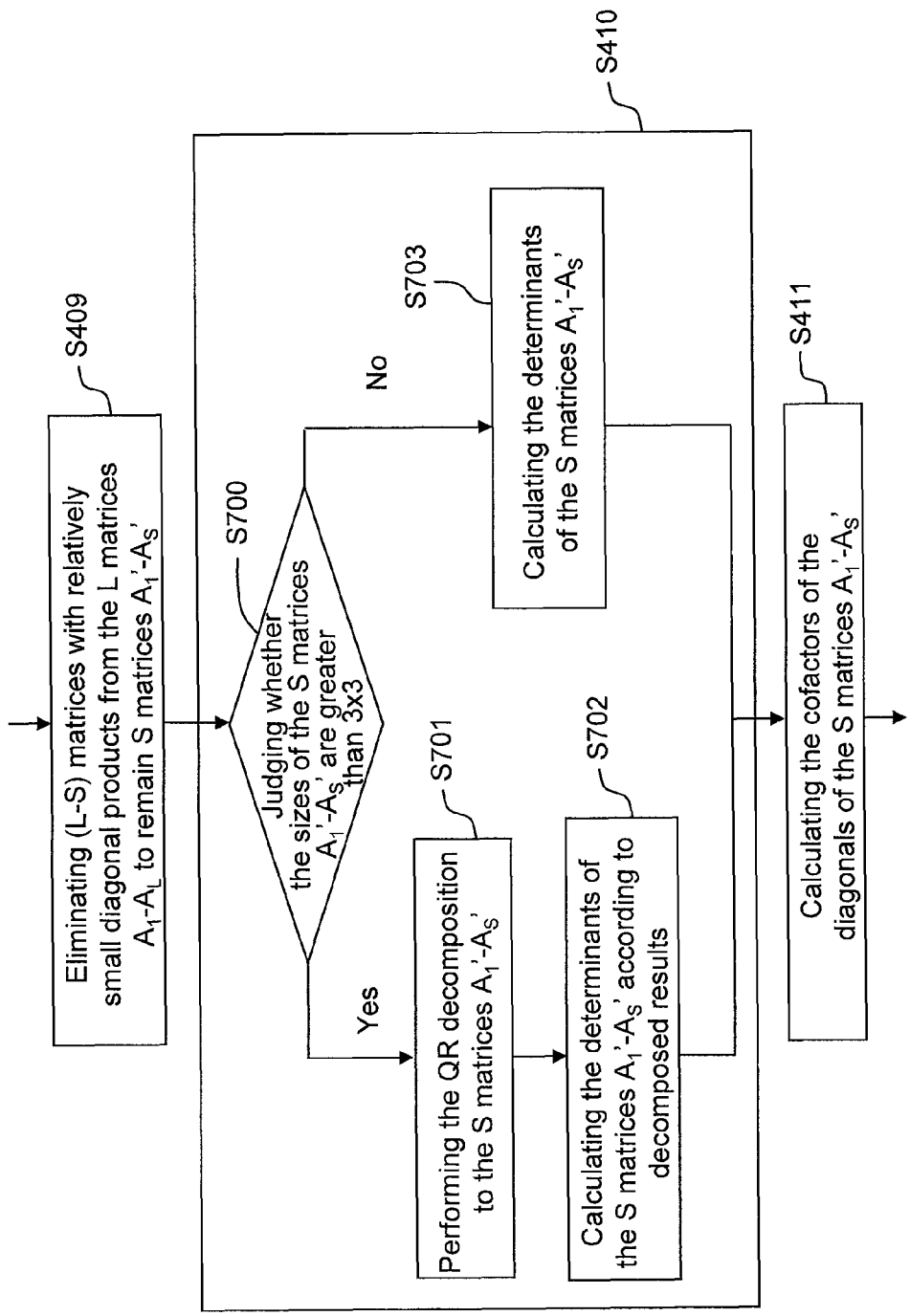
FIG. 7 is a detailed flowchart of a step S410 of FIG. 4.

Next, referring to FIG. 7, FIG. 7 is a detailed flowchart of the step S410 of FIG. 4. In the step S410, the QR decomposition is used to simplify each of the matrices $A_1'$–$A_S'$ with a size greater than 3×3, so as to quickly calculate the determinants thereof. Certainly, the above concept of using the QR decomposition to simplify calculation of the determinants can be applied to the steps S108, S308 and S510.

In step S700, the judgment unit 202 of the codebook searching apparatus 200 judges whether the sizes of the S matrices $A_1'$–$A_S'$ are greater than 3×3. If the sizes of the S matrices $A_1'$–$A_S'$ are smaller than 3×3, the calculation unit 203 of the codebook searching apparatus 200 is notified to execute a step S703, and if the sizes of the S matrices $A_1'$–$A_S'$ are greater than 3×3, the calculation unit 203 of the codebook searching apparatus 200 is notified to execute steps S701 and S702. In the step S703, since the size of the S matrices $A_1'$–$A_S'$ are smaller than 3×3, the calculation unit 203 of the codebook searching apparatus 200 directly calculates the determinants of the S matrices $A_1'$–$A_S'$.

In the step S701, since the size of the S matrices $A_1'$–$A_S'$ are greater than 3×3, the calculation unit 203 of the codebook searching apparatus 200 performs the QR decomposition to the S matrices $A_1'$–$A_S'$. Wherein, the calculation unit 203 includes the QR decomposition calculation unit, and the QR decomposition calculation unit can be a QR decomposition calculation unit which originally exists in the receiver. Next, in the step S702, the calculation unit 203 of the codebook searching apparatus 200 calculates the determinants of the S matrices $A_1'$–$A_S'$ according to decomposed results. Wherein, how to calculates the determinants of the S matrices $A_1'$–$A_S'$ according to the decomposed results has been described above, and therefore detailed description thereof is not repeated.

Referring to FIG. 4 again, implementation of simplifying the division operation of the step S413 is introduced. However, the implementation of simplifying the division operation can also be applied to the step S111. Since the decision unit 204 of the codebook searching apparatus 200 needs to obtain a minimum one of ratios between the maximum cofactors of the diagonals and the determinants of the matrices $A_1'$–$A_S'$, the decision unit 204 of the codebook searching apparatus 200 has to perform the division operations. However, the division operations can be avoided through cross multiplication.

First, the decision unit 204 of the codebook searching apparatus 200 arbitrarily selects two values from 1-S for p and j. Next, the decision unit 204 of the codebook searching apparatus 200 compares the ratios between the maximum cofactors of the diagonals and the determinants of the matrices $A_p'$ and $A_j'$ (p is not equal to j). Comparison of $c^p/det(A_p')$ and $c^j/det(A_j')$ is equivalent to comparison of $c^p \times det(A_j')$ and $c^j \times det(A_p')$, wherein the determinants of the matrices $A_p'$ and $A_j'$ are respectively $det(A_p')$ and $det(A_j')$, and the maximum cofactors of the diagonals of the matrices $A_p'$ and $A_j'$ are respectively $c^p$ and $c^j$. If $c^p \times det(A_j')$ is smaller than $c^j \times det(A_p')$, the decision unit 204 of the codebook searching apparatus 200 sets the index value x to p, and renews the value of j, wherein j is not a value ever selected by j and p. If $c^j \times det(A_p')$ is smaller than $c^p \times det(A_j')$, the decision unit 204 of the codebook searching apparatus 200 sets the index value x to j, and renews the value of p, wherein p is not a value ever selected by j and p. The above comparison is repeated until p and j have no value to select, and the decision unit 204 of the codebook searching apparatus 200 then finds the pre-coding matrix $F_x$ corresponding to the minimum one of the ratios between the maximum cofactors of the diagonals and the determinants of the matrices $A_1'$–$A_S'$.

Figure 8:
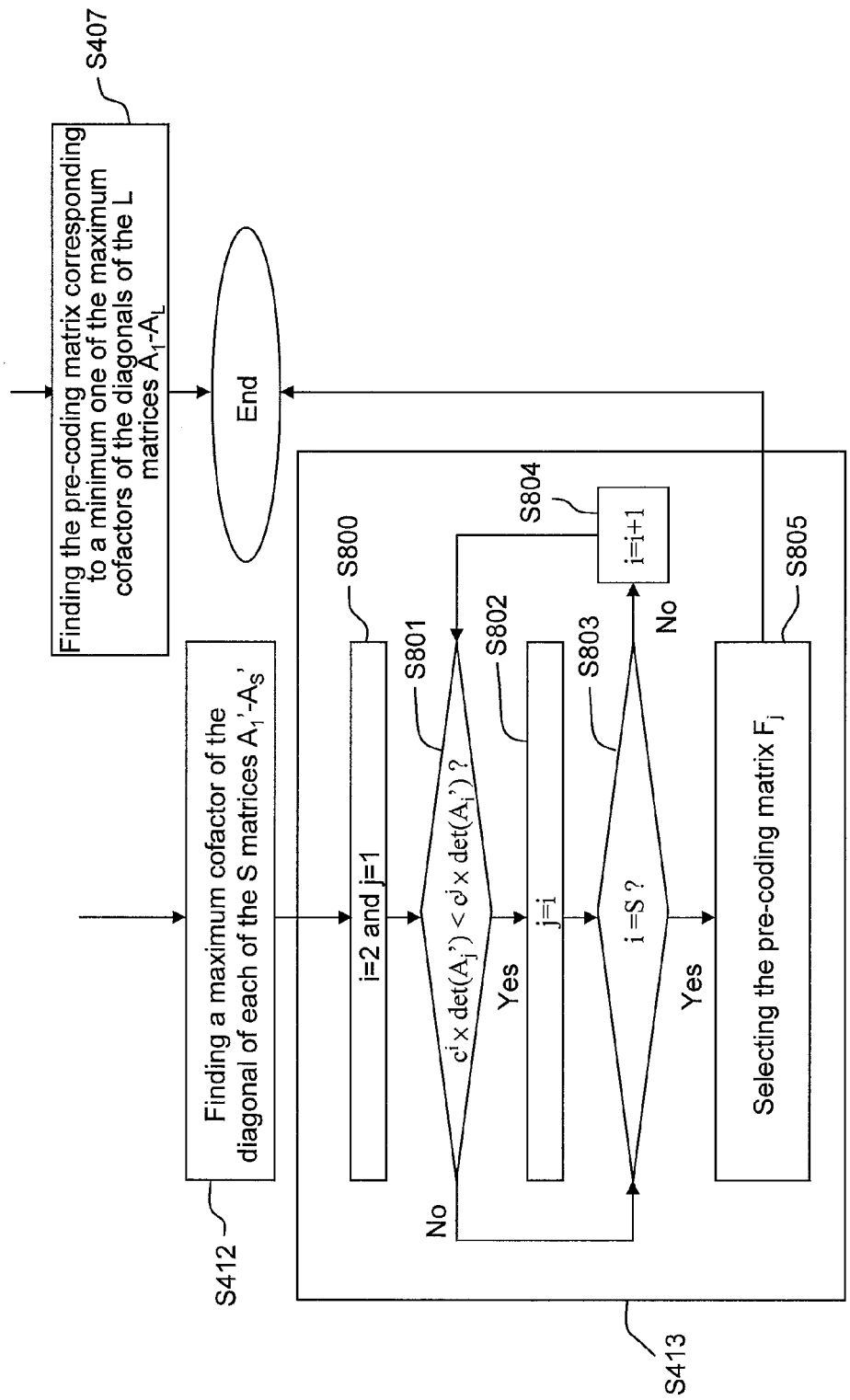
FIG. 8 is a detailed flowchart of a step S413 of FIG. 4.

Next, referring to FIG. 8, FIG. 8 is a detailed flowchart of the step S413 of FIG. 4. Here, the maximum cofactors of the diagonals of the matrices $A_1'$–$A_S'$ are first defined to be $c^1$–$c^S$. In step S800, the decision unit 204 of the codebook searching apparatus 200 respectively sets i and j to be 2 and 1. Next, in step S801, the decision unit 204 of the codebook searching apparatus 200 judges whether $c^i \times det(A_j')$ is smaller than $c^j \times det(A_i')$. If $c^i \times det(A_j')$ is smaller than $c^j \times det(A_i')$, in step S802, the decision unit 204 of the codebook searching apparatus 200 sets j to be i. If $c^i \times det(A_3')$ is not smaller than $c^j \times det(A_i')$, a step S803 is executed.

In the step S803, the decision unit 204 of the codebook searching apparatus 200 determines whether i is equal to S, and if i is equal to S, a step S805 is executed, and if i is not equal to S, a step S804 is executed. In the step S804, the decision unit 204 of the codebook searching apparatus 200 adds i by 1, i.e. i=i+1. In the step S805, the decision unit 204 of the codebook searching apparatus 200 selects the pre-coding matrix $F_j$ for the receiver to use. By comparing each two cross multiplications, the division operation of the step S413 can be avoided.

In summary, the present disclosure provides multiple pre-coding searching methods and the apparatus thereof, and in the pre-coding searching methods, the calculation amount can be reduced by calculating the cofactors of the diagonals or the determinants.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A codebook searching method for a communication system, wherein the communication system uses a codebook having L pre-coding matrices, and L is greater than or equal to 2, the codebook searching method comprising:
   calculating L matrices according to the L pre-coding matrices, wherein the L matrices are inversed mean square error (MSE) matrices of the L pre-coding matrices; and
   executing a first step when the L pre-coding matrices are square,
   wherein the first step comprises:
      calculating cofactors of diagonals of the L matrices;
      finding a maximum cofactor of the diagonal of each of the L matrices; and
      finding a pre-coding matrix corresponding to a minimum one of the maximum cofactors of the diagonals of the L matrices.

2. The codebook searching method as claimed in claim 1, further comprising:
   selectively executing one of a second to a third steps when the L pre-coding matrices are non-square, wherein the second step comprises:
  calculating determinants of the L matrices;
  calculating the cofactors of the diagonals of the L matrices;
  finding the maximum cofactor of the diagonal of each of the L matrices; and
  finding a pre-coding matrix corresponding to a minimum one of ratios among the maximum cofactors of the diagonals and the determinants of the L matrices; and
wherein the third step comprises:
  calculating the determinants of the L matrices; and
  finding a pre-coding matrix corresponding to a maximum one of the determinants of the L matrices.

3. The codebook searching method as claimed in claim 1, further comprising:
  selectively executing one of a second to a third steps when the L pre-coding matrices are non-square,
  wherein the second step comprises:
    calculating diagonal products of the L matrices;
    eliminating (L−S) matrices with relatively small diagonal products from the L matrices to remain S matrices, wherein S is less than L and is greater than or equal to 1;
    calculating determinants of the S matrices;
    calculating cofactors of diagonals of the S matrices;
    finding a maximum cofactor of the diagonal of each of the S matrices; and
    finding a pre-coding matrix corresponding to a minimum one of ratios among the maximum cofactors of the diagonals and the determinants of the S matrices;
  wherein the third step comprises:
    calculating the diagonal products of the L matrices;
    eliminating (L−S) matrices with relatively small diagonal products from the L matrices to remain S matrices, wherein S is less than L and is greater than or equal to 1;
    calculating the determinants of the S matrices; and
    finding a pre-coding matrix corresponding to a maximum one of the determinants of the S matrices.

4. The codebook searching method as claimed in claim 3, wherein the step of calculating the determinants of the S matrices further comprises:
  determining whether sizes of the S matrices are greater than 3×3;
  directly calculating the determinants of the S matrices when the sizes of the S matrices are smaller than 3×3; and
  performing QR decompositions to the S matrices when the sizes of the S matrices are greater than 3×3, and calculating the determinants of the S matrices according to results of the QR decompositions.

5. The codebook searching method as claimed in claim 3, wherein the step of finding the pre-coding matrix corresponding to the minimum one of the ratios between the maximum cofactors of the diagonals and the determinants of the S matrices further comprises:
  arbitrarily selecting two matrices $A_j$ and $A_i$ from the S matrices;
  comparing $c^i \times det(A_j)$ and $c^j \times det(A_i)$, wherein $c^i$ and $c^j$ are maximum cofactors of the diagonals of the matrices $A_i$ and $A_j$, and $det(A_i)$ and $det(A_j)$ are the determinants of the matrices $A_i$ and $A_j$, and i is not equal to j;
  setting an index value x=i, and renewing a value of j if $c^i \times det(A_j)$ is smaller than $c^j \times det(A_i)$, wherein j is not a value ever selected by i and j;
  setting an index value x=j, and renewing a value of i if $c^j \times det(A_i)$ is smaller than $c^i \times det(A_j)$, wherein i is not a value ever selected by i and j; and
  repeating the above steps until i and j have no value to select, and selecting the pre-coding matrix $F_x$.

6. The codebook searching method as claimed in claim 2, wherein the step of calculating the determinants of the L matrices further comprises:
  determining whether sizes of the L matrices are greater than 3×3;
  directly calculating the determinants of the L matrices when the sizes of the L matrices are smaller than 3×3; and
  performing QR decompositions to the L matrices when the sizes of the L matrices are greater than 3×3, and calculating the determinants of the L matrices according to results of the QR decompositions.

7. The codebook searching method as claimed in claim 2, wherein the step of finding the pre-coding matrix corresponding to the minimum one of the ratios between the maximum cofactors of the diagonals and the determinants of the L matrices further comprises:
  arbitrarily selecting two matrices $A_j$ and $A_i$ from the L matrices;
  comparing $c^i \times det(A_j)$ and $c^j \times det(A_i)$, wherein $c^i$ and $c^j$ are maximum cofactors of the diagonals of the matrices $A_i$ and $A_j$, and $det(A_i)$ and $det(A_j)$ are the determinants of the matrices $A_i$ and $A_j$, and i is not equal to j;
  setting an index value x=i, and renewing a value of j if $c^i \times det(A_j)$ is smaller than $c^j \times det(A_i)$, wherein j is not a value ever selected by i and j;
  setting an index value x=j, and renewing a value of i if $c^j \times det(A_i)$ is smaller than $c^i \times det(A_j)$, wherein i is not a value ever selected by i and j; and
  repeating the above steps until i and j have no value to select, and selecting the pre-coding matrix $F_x$.

8. A codebook searching method for a communication system, wherein the communication system uses a codebook having L pre-coding matrices, and L is greater than or equal to 2, the codebook searching method comprising:
  calculating L matrices according to the L pre-coding matrices, wherein and the L matrices are inversed MSE matrices of the L pre-coding matrices; and
  selectively executing one of a first to a fourth steps when the L pre-coding matrices are non-square,
  wherein the first step comprises:
    calculating determinants of the L matrices;
    calculating cofactors of diagonals of the L matrices;
    finding a maximum cofactor of the diagonal of each of the L matrices; and
    finding a pre-coding matrix corresponding to a minimum one of ratios between the maximum cofactors of the diagonals and the determinants of the L matrices;
  wherein the second step comprises:
    calculating the determinants of the L matrices; and
    obtaining a pre-coding matrix corresponding to the maximum one of the determinants of the L matrices;
  wherein the third step comprises:
    calculating diagonal products of the L matrices;
    eliminating (L−S) matrices with relatively small diagonal products from the L matrices to remain S matrices, wherein S is less than L and is greater than or equal to 1;
    calculating determinants of the S matrices;
    calculating cofactors of diagonals of the S matrices;
    finding a maximum cofactor of the diagonal of each of the S matrices; and finding a pre-coding matrix corresponding to a minimum one of ratios between the maximum cofactors of the diagonals and the determinants of the S matrices;

wherein the fourth step comprises:
calculating the diagonal products of the L matrices;
eliminating (L−S) matrices with relatively small diagonal products from the L matrices to remain S matrices, wherein S is less than L and is greater than or equal to 1;
calculating the determinants of the S matrices; and
finding a pre-coding matrix corresponding to a maximum one of the determinants of the S matrices.

9. The codebook searching method as claimed in claim 8, further comprising:
selectively executing one of a fifth step when the L pre-coding matrices are non-square,
wherein the fifth step comprises:
calculating the cofactors of the diagonals of the L matrices;
finding the maximum cofactor of the diagonal of each of the L matrices; and
finding a pre-coding matrix corresponding to a minimum one of the maximum cofactors of the diagonals of the L matrices.

10. The codebook searching method as claimed in claim 8, wherein the step of calculating the determinants of the S matrices further comprises:
determining whether sizes of the S matrices are greater than 3×3;
directly calculating the determinants of the S matrices when the sizes of the S matrices are smaller than 3×3; and
performing QR decompositions to the S matrices when the sizes of the S matrices are greater than 3×3, and calculating the determinants of the S matrices according to results of the QR decompositions.

11. The codebook searching method as claimed in claim 8, wherein the step of finding the pre-coding matrix corresponding to the minimum one of the ratios between the maximum cofactors of the diagonals and the determinants of the S matrices further comprises:
arbitrarily selecting two matrices $A_j$ and $A_i$ from the S matrices;
comparing $c^i \times \det(A_j)$ and $c^j \times \det(A_i)$, wherein $c^i$ and $c^j$ are maximum cofactors of the diagonals of the matrices $A_i$ and $A_j$, and $\det(A_i)$ and $\det(A_j)$ are the determinants of the matrices $A_i$ and $A_j$, and i is not equal to j;
setting an index value x=i, and renewing a value of j if $c^i \times \det(A_j)$ is smaller than $c^j \times \det(A_i)$, wherein j is not a value ever selected by i and j;
setting an index value x=j, and renewing a value of i if $c^j \times \det(A_i)$ is smaller than $c^i \times \det(A_j)$, wherein i is not a value ever selected by i and j; and
repeating the above steps until i and j have no value to select, and selecting the pre-coding matrix $F_x$.

12. The codebook searching method as claimed in claim 8, wherein the step of calculating the determinants of the L matrices further comprises:
determining whether sizes of the L matrices are greater than 3×3;
directly calculating the determinants of the L matrices when the sizes of the L matrices are smaller than 3×3; and
performing QR decompositions to the L matrices when the sizes of the L matrices are greater than 3×3, and calculating the determinants of the L matrices according to results of the QR decompositions.

13. The codebook searching method as claimed in claim 8, wherein the step of finding the pre-coding matrix corresponding to the minimum one of the ratios between the maximum cofactors of the diagonals and the determinants of the L matrices further comprises:
arbitrarily selecting two matrices $A_j$ and $A_i$ from the L matrices;
comparing $c^i \times \det(A_j)$ and $c^j \times \det(A_i)$, wherein $c^i$ and $c^j$ are maximum cofactors of the diagonals of the matrices $A_i$ and $A_j$, and $\det(A_i)$ and $\det(A_j)$ are the determinants of the matrices $A_i$ and $A_j$, and i is not equal to j;
setting an index value x=i, and renewing a value of j if $c^i \times \det(A_j)$ is smaller than $c^j \times \det(A_i)$, wherein j is not a value ever selected by i and j;
setting an index value x=j, and renewing a value of i if $c^j \times \det(A_i)$ is smaller than $c^i \times \det(A_j)$, wherein i is not a value ever selected by i and j; and
repeating the above steps until i and j have no value to select, and selecting the pre-coding matrix $F_x$.

14. A codebook searching apparatus for a communication system, wherein the communication system uses a codebook having L pre-coding matrices, and L is greater than or equal to 2, the codebook searching apparatus comprising:
a matrix operation unit, calculating L matrices according to the L pre-coding matrices, wherein the L matrices are inversed MSE matrices of the L pre-coding matrices;
a judgment unit, judging whether the L pre-coding matrices are square, and controlling a calculation unit and a decision unit;
the calculation unit, calculating maximum cofactors of diagonals of the L matrices when the L pre-coding matrices are square, and calculating the maximum cofactors of the diagonals and determinants of at least S matrices of the L matrices when the L pre-coding matrices are non-square, wherein L is greater than S; and
the decision unit, finding a pre-coding matrix corresponding to a minimum one of the maximum cofactors of the diagonals of the L matrices when the L pre-coding matrices are square, and finding a pre-coding matrix corresponding to a minimum one of ratios between the maximum cofactors of the diagonals and the determinants of the at least S matrices when the L pre-coding matrices are non-square.

15. The codebook searching apparatus as claimed in claim 14, wherein when the L pre-coding matrices are non-square, the calculation unit calculates diagonal products of the L matrices, and eliminates (L−S) matrices with relatively small diagonal products from the L matrices to remain S matrices, wherein S is less than L and is greater than or equal to 1.

16. The codebook searching apparatus as claimed in claim 14, wherein when the L pre-coding matrices are non-square, the judgment unit judges whether sizes of the at least S matrices are greater than 3×3, when the sizes of the at least S matrices are smaller than 3×3, the calculation unit directly calculates the determinants of the at least S matrices, and when the sizes of the at least S matrices are greater than 3×3, the calculation unit first performs QR decompositions to the at least S matrices and calculates the determinants of the at least S matrices according to results of the QR decompositions.

17. The codebook searching apparatus as claimed in claim 16, wherein the step of the decision unit finding the pre-coding matrix corresponding to the minimum one of ratios between the maximum cofactors of the diagonals and the determinants of the at least S matrices further comprises:
arbitrarily selecting two matrices $A_j$ and $A_i$ from the at least S matrices;

comparing $c^i \times \det(A_j)$ and $c^j \times \det(A_i)$, wherein $c^i$ and $c^j$ are maximum cofactors of the diagonals of the matrices $A_i$ and $A_j$, and $\det(A_i)$ and $\det(A_j)$ are the determinants of the matrices $A_i$ and $A_j$, and i is not equal to j;

setting an index value x=i, and renewing a value of j if $c^i \times \det(A_j)$ is smaller than $c^j \times \det(A_i)$, wherein j is not a value ever selected by i and j;

setting an index value x=j, and renewing a value of i if $c^j \times \det(A_i)$ is smaller than $c^i \times \det(A_j)$, wherein i is not a value ever selected by i and j; and repeating the above steps until i and j have no value to select, and selecting the pre-coding matrix $F_x$.

18. A codebook searching apparatus for a communication system, wherein the communication system uses a codebook having L pre-coding matrices, and L is greater than or equal to 2, the codebook searching apparatus comprising:

a matrix operation unit, calculating L matrices according to the L pre-coding matrices, wherein the L matrices are inversed MSE matrices of the L pre-coding matrices;

a judgment unit, judging whether the L pre-coding matrices are square, and controlling a calculation unit and a decision unit;

the calculation unit, calculating maximum cofactors of diagonals of the L matrices when the L pre-coding matrices are square, and calculating determinants of at least S matrices of the L matrices when the L pre-coding matrices are non-square, wherein L is greater than S; and the decision unit, finding a pre-coding matrix corresponding to a minimum one of the maximum cofactors of the diagonals of the L matrices when the L pre-coding matrices are square, and finding a pre-coding matrix corresponding to a maximum one of the determinants of the at least S matrices when the L pre-coding matrices are non-square.

19. The codebook searching apparatus as claimed in claim 18, wherein when the L pre-coding matrices are non-square, the calculation unit calculates diagonal products of the L matrices, and eliminates (L−S) matrices with relatively small diagonal products from the L matrices to remain S matrices, wherein S is less than L and is greater than or equal to 1.

20. The codebook searching apparatus as claimed in claim 18, wherein when the L pre-coding matrices are non-square, the judgment unit judges whether sizes of the at least S matrices are greater than 3×3, when the sizes of the at least S matrices are smaller than 3×3, the calculation unit directly calculates the determinants of the at least S matrices, and when the sizes of the at least S matrices are greater than 3×3, the calculation unit first performs QR decompositions to the at least S matrices and calculates the determinants of the at least S matrices according to results of the QR decompositions.

* * * * *